(12) United States Patent
Pilling et al.

(10) Patent No.: US 6,250,611 B1
(45) Date of Patent: Jun. 26, 2001

(54) VAPOR-LIQUID CONTACT APPARATUS

(75) Inventors: Mark W. Pilling, Jenks; Dale E. Nutter, Tulsa, both of OK (US)

(73) Assignee: Sulzer Chemtech USA, Inc., Tulsa, OK (US)

( * ) Notice: Subject to any disclaimer, the term of this patent is extended or adjusted under 35 U.S.C. 154(b) by 0 days.

(21) Appl. No.: 09/413,885

(22) Filed: Oct. 7, 1999

(51) Int. Cl.⁷ ...................................................... B01F 3/04
(52) U.S. Cl. ................... 261/114.1; 261/114.3; 261/114.5
(58) Field of Search .................... 261/114.1, 114.3, 261/114.4, 114.5

(56) References Cited

U.S. PATENT DOCUMENTS

| | | |
|---|---|---|
| 2,684,837 | 7/1954 | North et al. |
| 2,693,949 | 11/1954 | Huggins. |
| 2,982,527 | 5/1961 | Eld et al. |
| 3,417,975 * | 12/1968 | Williams et al. .................. 261/114.1 |
| 3,463,464 * | 8/1969 | Nutter et al. ....................... 261/114.1 |
| 3,729,179 | 4/1973 | Keller ................................ 261/114.1 |
| 3,747,905 | 7/1973 | Nutter. |
| 3,797,811 | 3/1974 | Jullien et al. ..................... 261/114.1 |
| 4,132,761 | 1/1979 | Mix. |
| 4,275,021 | 6/1981 | Kirkpatrick et al. ............. 261/114.3 |
| 4,504,426 | 3/1985 | Chuang et al. .................... 261/114.1 |
| 4,547,326 * | 10/1985 | Weiler ................................ 261/114.1 |
| 4,836,989 | 6/1989 | Aly et al. .............................. 422/195 |
| 4,872,955 | 10/1989 | Parker et al. |
| 4,956,127 | 9/1990 | Binkley et al. ................... 261/114.1 |
| 5,106,556 | 4/1992 | Binkley et al. ................... 261/114.1 |
| 5,120,474 | 6/1992 | Binkley et al. ................... 261/114.4 |
| 5,147,584 | 9/1992 | Binkley et al. ................... 261/114.3 |
| 5,164,125 | 11/1992 | Binkley et al. ................... 261/114.1 |
| 5,192,466 | 3/1993 | Binkley .............................. 261/114.3 |
| 5,213,719 | 5/1993 | Chuang. |
| 5,242,628 | 9/1993 | Nye .................................... 261/114.1 |
| 5,277,847 | 1/1994 | Gentry et al. ..................... 261/114.1 |
| 5,277,848 | 1/1994 | Binkley et al. ................... 261/114.1 |
| 5,360,583 | 11/1994 | Nutter. |
| 5,389,343 | 2/1995 | Gentry .................................. 422/191 |
| 5,403,560 | 4/1995 | Deshpande et al. ................. 422/190 |
| 5,453,222 | 9/1995 | Lee et al. .......................... 261/114.1 |
| 5,454,989 | 10/1995 | Nutter ................................ 261/114.1 |
| 5,468,425 | 11/1995 | Nutter. |

(List continued on next page.)

FOREIGN PATENT DOCUMENTS

WO98/32511  7/1998  (WO).

OTHER PUBLICATIONS

MVG Tray Product Sheet of Nutter Engineering (date not indicated).

Primary Examiner—C. Scott Bushey
(74) Attorney, Agent, or Firm—Smith, Gambrell & Russell

(57) ABSTRACT

Vapor-liquid contact apparatus for chemical processing includes a vessel containing a plurality of spaced horizontal trays which support a vapor-liquid mixture, and downcomers which carry liquid down from one tray to another. Each tray has an infeed area, a bubbling area which has apertures for introducing vapor into the vapor-liquid mixture on the tray, and a liquid exit opening at the downstream end of the bubbling area. The downcomer receives the vapor-liquid mixture from the bubbling area, and it has a floor which increases the residence time of the vapor-liquid mixture in the downcomer. The floor forms an outlet which feeds liquid to the infeed area of a subsequent tray. The downcomer outlet is an elongated slot formed between a convex outer edge of the floor and a convex outer edge of the downcomer cross-section. To provide more uniform flow across the width of a bubbling area, the outlet slot which feeds the bubbling area is not wider, and is preferably narrower, at its centerline than at locations which are laterally spaced from the centerline.

52 Claims, 5 Drawing Sheets

U.S. PATENT DOCUMENTS

| | | | |
|---|---|---|---|
| 5,480,595 | 1/1996 | Yeoman et al. | 261/114.1 |
| 5,496,446 | 3/1996 | Yeoman et al. | 202/158 |
| 5,547,617 | 8/1996 | Lee et al. | 261/114.5 |
| 5,554,346 | 9/1996 | Perry et al. | 422/195 |
| 5,567,396 | 10/1996 | Perry et al. | 422/190 |
| 5,593,548 | 1/1997 | Yeoman et al. | 203/29 |
| 5,618,473 | 4/1997 | Sauter et al. | 261/114.1 |
| 5,632,935 | 5/1997 | Yeoman et al. | 261/114.1 |
| 5,645,770 | 7/1997 | McNulty et al. | 261/97 |
| 5,702,647 | 12/1997 | Lee et al. | 261/114.5 |
| 5,707,563 | 1/1998 | Monkelbaan et al. | 261/98 |
| 5,762,668 | 6/1998 | Lee et al. | 55/486 |
| 5,788,894 | 8/1998 | Yeoman et al. | 261/114.3 |
| 5,895,608 | 4/1999 | Lee et al. | |
| 5,951,827 | 9/1999 | Breedon. | |
| 5,975,504 | 11/1999 | Nutter et al. | |
| 6,003,847 | 12/1999 | Lee et al. | |
| 6,053,484 | 4/2000 | Fan et al. | |
| 6,076,813 | 6/2000 | Yeoman et al. | |
| 6,113,079 * | 9/2000 | Urbanski et al. | 261/114.5 |

* cited by examiner

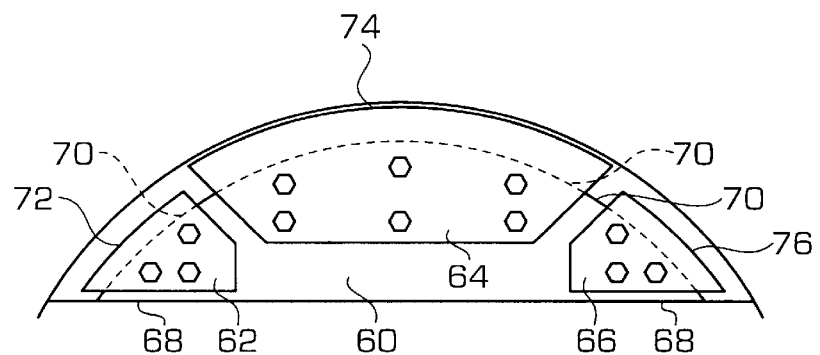
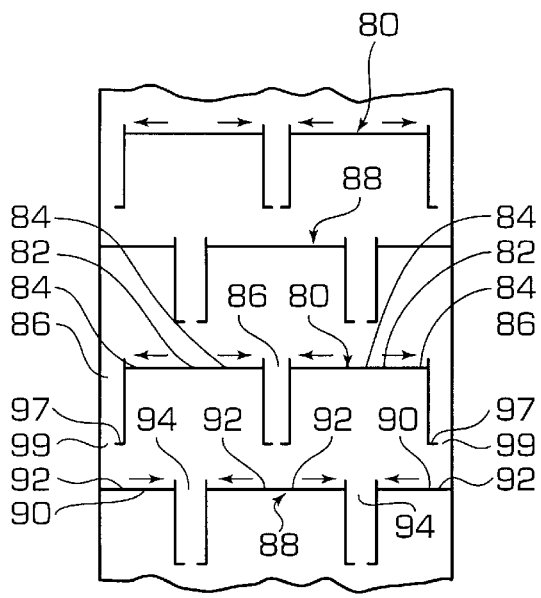
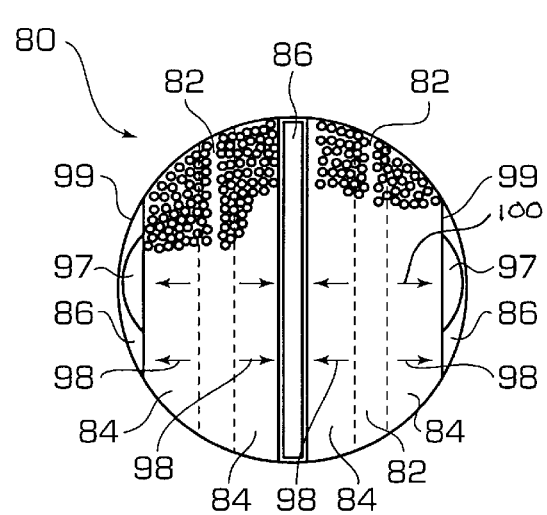

VAPOR-LIQUID CONTACT APPARATUS

BACKGROUND OF THE INVENTION

This invention relates to improvements in vapor-liquid contact apparatus used in chemical processing, and particularly to the type of such apparatus in which a vessel contains a plurality of substantially horizontal trays which support a vapor-liquid mixture; liquid is introduced at the upper end of the vessel and it flows down from tray-to-tray, via downcomers; each downcomer has a floor which form a downwardly facing outlet for releasing liquid from the downcomer to a subsequent tray; and, the trays are apertured to provide bubbling areas through which ascending vapors can rise to contact liquid and/or vapor-liquid mixtures which are supported on and flowing across them.

It has been recognized in the art that the performance of contact tray apparatus can be enhanced if the liquid flow on the tray is uniform in the respect that the flow in the lateral areas of the tray is substantially the same as the flow along the central flow axis thereof. Heretofore, shaped downcomer tips, directional vapor outlets and other means have been utilized for this purpose.

It has also been recognized in the art that, by providing apertured floors in downcomers, the deentrainment of vapors from liquid from the vapor-liquid mixture in downcomers can be improved by providing the downcomers with apertured floors which increase the residence time of the vapor-liquid mixture in the downcomers. Downcomer floor configurations disclosed in this specification serves both to increase the residence time of the vapor-liquid mixture in the downcomer and to provide a more uniform flow of the vapor-liquid mixture in the bubbling area of a tray.

According to the present invention, the flow of fluid into the bubbling area of a tray is made more uniform across the width of the bubbling area by providing a novel shape and location of a downwardly facing liquid outlet opening of a downcomer which feeds the tray. Utilizing the simple and effective design of the present invention, the apparatus will have increased capacity, higher efficiency, and a greater operating range. The risk of fouling or plugging the downcomer outlet is minimized. By providing adjustability of the components which define the novel downcomer outlet opening, the apparatus can be fine-tuned to achieve optimum performance.

It has been observed experimentally that, when liquid is released through a circular outlet opening (a pour point) in a downcomer floor, and the liquid from the pour point strikes a target area on an unobstructed flat surface, the liquid flows from the pour point in the form of an expanding shallow inner ring which extends radially from the pour point. The liquid depth suddenly increases in an annular area, referred to in this specification as an "hydraulic jump ring" which is concentric with the target area and the pour point.

When two pour points are close enough together that the hydraulic jump rings emanating from their respective target areas interact, an even deeper wave is formed equidistantly from the target areas. By using an elongated downcomer outlet opening or openings in accordance with the present invention, these deeper waves are eliminated or reduced in number.

When the target area of a pour point is near an obstruction such as the inner wall of a vessel, the liquid emanating radially from the target area will strike and rebound from the vessel wall. Due to the concave curvature of the wall of a cylindrical vessel, some of the rebounding liquid will be directed toward the central flow axis of the tray, thus causing a focusing effect which results in a higher flow rate at the central flow axis of the tray than at the sides thereof. This is of particular concern when the outer edge of a downcomer outlet slot is contiguous with the inner wall of the vessel, thus avoiding the undesirable rebound and focusing effect which is associated with prior floored downcomers.

This invention is based in part on the recognition that there are inherent deficiencies in the liquid distribution at the upstream ends of the bubbling areas of the trays in the apparatus described above, particularly due to the configurations and arrangements of the apertures in the downcomer floors. Significant features of the apparatus disclosed in this specification are believed to represent new and beneficial approaches to the design and construction of such apparatus.

SUMMARY OF THE INVENTION

According to one principal feature of the present invention, a vapor-liquid contact apparatus comprises a vessel, and a plurality of vertically spaced horizontal trays in the vessel for supporting a vapor-liquid mixture. Each of the trays has a bubbling area, a liquid infeed area at an upstream end of the bubbling area, and an exit opening at a downstream end of the bubbling area. The bubbling area has a central flow axis which leads from the liquid infeed area to the exit opening, and apertures which permit ascending vapors to flow up through the tray and into a vapor-liquid mixture on the tray. A downcomer is provided for receiving the vapor-liquid mixture from the tray and for carrying liquid to another tray. The downcomer has an upper portion located at the exit opening of the tray, and a lower portion with a cross-section which is surrounded by an inner edge and a convex outer edge. These edges are transverse with respect to the central flow axis. The cross-section of the downcomer has a centerline which is parallel to the central flow axis of the bubbling area. A downcomer floor is provided in the above-mentioned cross-section to control flow of liquid from the downcomer. The downcomer floor forms a downcomer outlet which includes an elongated downcomer outlet slot or series of slots, each of which has a length which is greater than its width, the width being perpendicular to the outer edge of the downcomer and the length being parallel to the outer edge of the downcomer. The slot width at the centerline of the cross-section is no greater than the slot width at locations which are spaced from the centerline.

According to another main feature of the invention, a vapor-liquid contact apparatus comprises a vessel, and a plurality of vertically spaced horizontal trays in the vessel for supporting a vapor-liquid mixture. Each of the trays has a bubbling area, a liquid infeed area at an upstream end of the bubbling area, and an exit opening at a downstream end of the bubbling area. The bubbling area has a central flow axis which leads from the liquid infeed area to the exit opening, and apertures which permit ascending vapors to flow up through the tray and into a vapor-liquid mixture on the tray. A downcomer is provided for receiving the vapor-liquid mixture from the tray and for carrying liquid to another tray. The downcomer has an upper portion located at the exit opening of the tray, and a lower portion with a cross-section which is surrounded by an inner edge and a convex outer edge. These edges are transverse with respect to the central flow axis. The cross-section of the downcomer has a centerline which is parallel to the central flow axis of the bubbling area. A downcomer floor is provided in the above-mentioned cross-section to control flow of liquid from the downcomer. The downcomer floor has a convex outer edge, at least a portion of which is spaced from the outer edge of the cross-section of the downcomer to form a downcomer outlet which includes an elongated downcomer outlet slot.

In connection with the foregoing features, the invention also includes a downcomer outlet which is wider at locations which are spaced from the downcomer centerline than at the downcomer centerline. The downcomer outlet has a total area no greater than 70% of the area of the downcomer cross-section where the downcomer floor is located. A preferred downcomer outlet is a slot with a length which is at least 60% of the length of the cross-section. The outlet slot has an end which is spaced from the downcomer centerline by a distance which is at least 30% of the length of said cross-section. The slot width is preferably no more than about 40% of the length of the cross-section.

A preferred embodiment of the invention utilizes a tray provided with jets which are located and oriented to accelerate movement of liquid from the liquid infeed area into and through the bubbling area. Each of the jets includes a jet opening in the tray and a deflector for deflecting vapors ascending through the jet opening in a direction away from the liquid infeed area. The jets have a spacing density which is less in areas near the central flow axis than in areas which are laterally spaced from the central flow axis.

In a preferred embodiment of the invention, stationary deflectors are located above each of the tray apertures in the bubbling area. These deflectors have upstream and downstream ends connected to the tray so that vapors ascending through the tray apertures are introduced laterally into liquid in the bubbling area.

Preferably, the liquid infeed area is substantially devoid of apertures to prevent ascending vapors from affecting the flow in a preceding downcomer of a tray thereabove and to prevent liquid in the preceding downcomer from weeping through the liquid infeed area.

An adjustable downcomer floor according to the invention includes a fixed plate and at least one adjustable plate which is mounted on the fixed plate, the adjustable plate has an edge which defines an edge of the downcomer outlet slot, and the adjustable plate is movable on the fixed plate to permit adjustments in slot configuration during installation of the apparatus. A plurality of such adjustable plates is preferred.

The downcomer floor has a convex outer edge which can be curved, formed of a plurality of linear sections, or formed of a plurality of spaced apart sections. The convex outer edge of the cross-section of the downcomer may be either spaced from the vessel or formed by an interior wall surface of the vessel. The convex outer edge of the cross-section of the downcomer may be arcuate or it may be formed of at least three straight lines.

BRIEF DESCRIPTION OF THE DRAWINGS

FIG. 12 shows a downcomer floor construction which permits on-site adjustments in the width and configuration of a downcomer outlet opening.

FIGS. 13 and 14 are diagrammatic vertical and horizontal sectional views which show an embodiment of the invention in a vessel provided with multipass trays.

DESCRIPTION OF PREFERRED EMBODIMENTS

Figure 1:
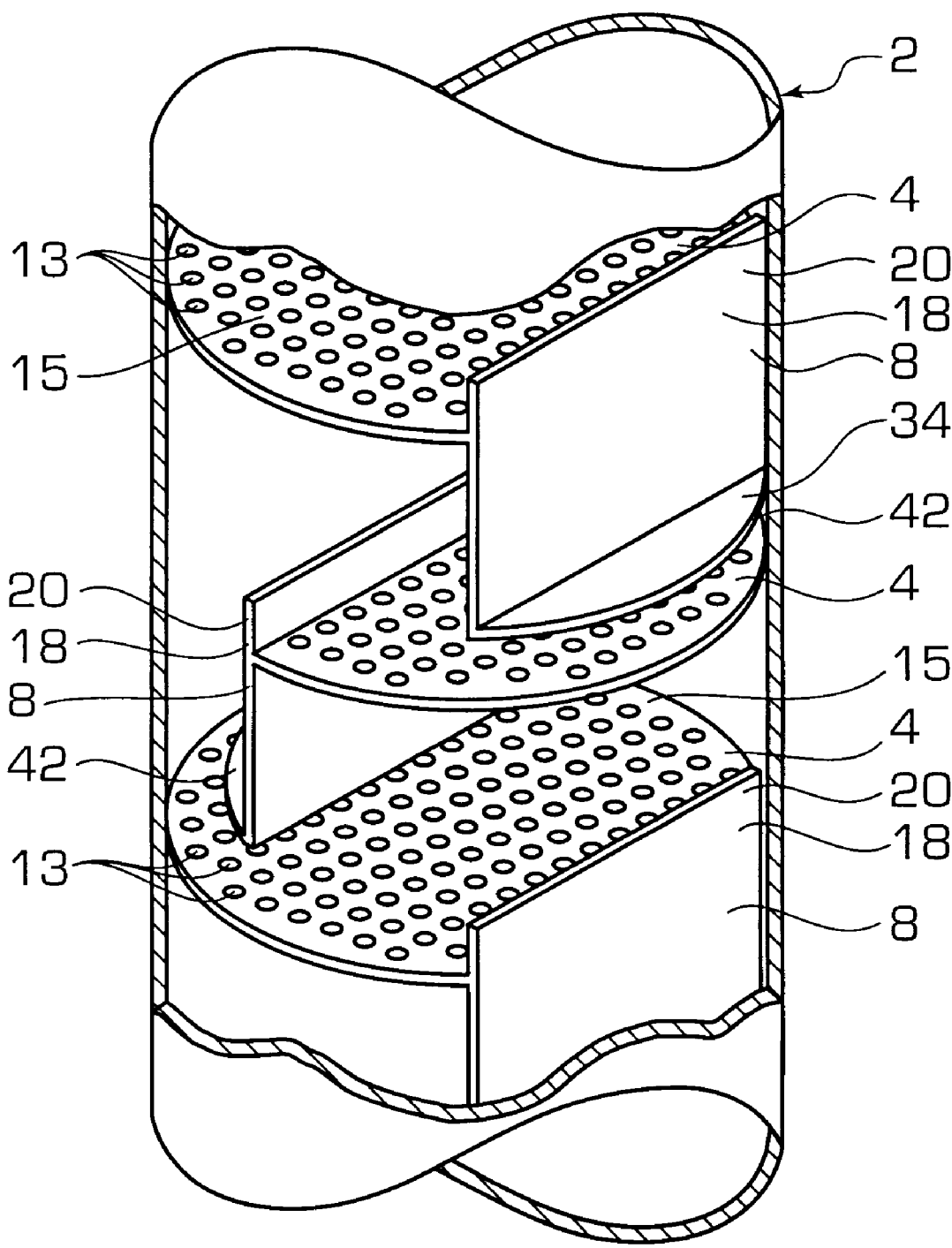
FIG. 1 is a diagrammatic perspective view of an apparatus according to the invention.
Figure 2:
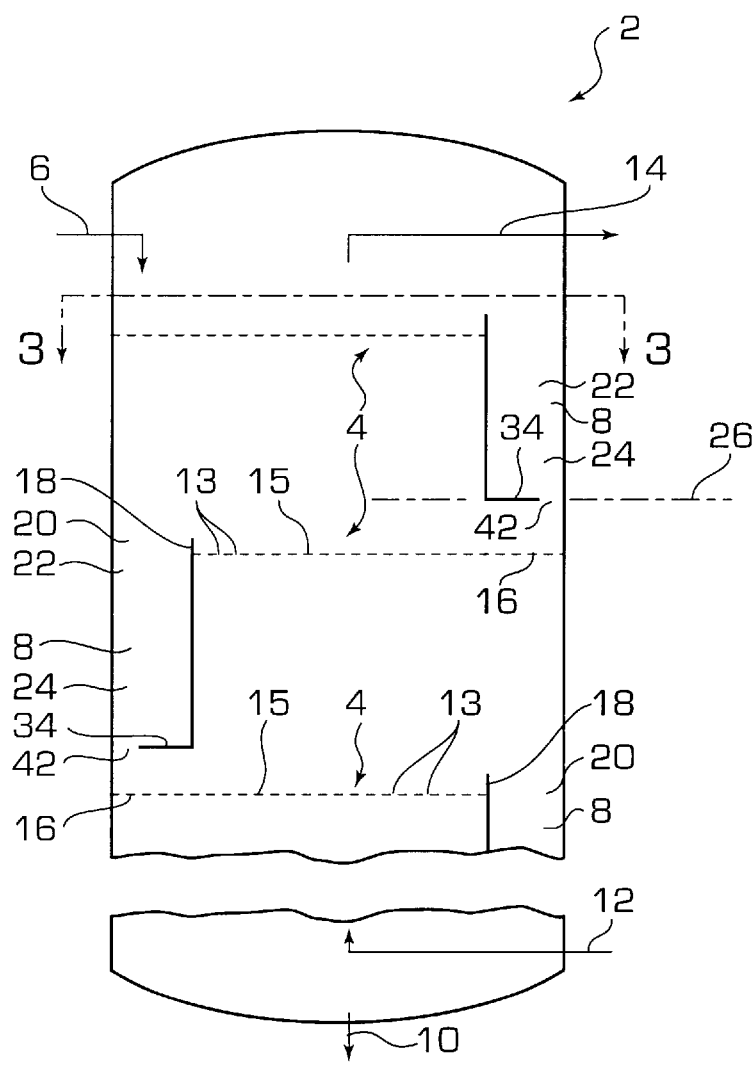
FIG. 2 is a diagrammatic sectional view of the apparatus, taken in a central plane which is parallel to the longitudinal centerline of the trays.
Figure 3:
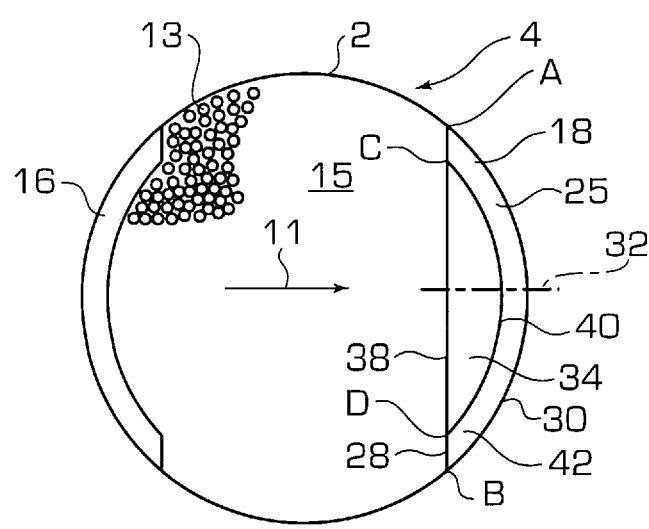
FIG. 3 is a diagrammatic sectional view of the apparatus, looking downwardly along the section line 3—3 of FIG. 2.

An apparatus constructed according to the invention, shown in FIGS. 1–3, is of conventional construction in the respect that it includes a vessel 2 which contains a plurality of vertically spaced horizontal contact trays 4 for supporting a vapor-liquid mixture. Liquid is introduced to the uppermost tray in the vessel by a supply line 6, it flows horizontally across the trays 4 and vertically though downcomers 8, until it is discharged from the vessel by a liquid outlet line 10. The central flow axis of the vapor-liquid mixture across a tray is identified by the reference numeral 11 in FIG. 3. Air or another gas applicable to the process is introduced into the vessel by a supply line 12, it moves upwardly through apertures 13 in the trays 4 where it mixes with the liquid supported on the trays to form a vapor-liquid mixture, and it exits the vessel via a gas discharge line 14.

Each tray 4 has an active bubbling area 15, an infeed area 16 at an upstream end of the bubbling area, and a weir 18 which leads to an exit opening 20 at the downstream end of the bubbling area. The apertures 13 in the bubbling area permit ascending vapors to flow up through the tray and into the vapor-liquid mixture on the tray. Preferably, the tray is substantially devoid of apertures in the infeed area 16 so vapors ascending from the apertures will not affect the incoming flow from the overlying downcomer, and liquid from the overlying downcomer will not weep through the infeed area. Each tray may be formed of multiple interconnected panels, including an upstream panel which contains the infeed area and is slightly elevated with respect to the panels downstream thereof.

At the exit opening 20 of the tray, the downcomer 8 receives the vapor-liquid mixture which flows over the weir 18. This two phase mixture, in a turbulent state, enters the upper end of the downcomer 8. During the residence time of the mixture in the downcomer 8, vapors are deentrained from the liquid. The deentrained vapors rise, and the liquid is discharged from the outlet at the bottom end of the downcomer as will be described below.

The downcomer has an upper portion 22 and a lower portion 24. The lower portion has a cross-section 25, shown in FIG. 3, which is taken in the downcomer floor plane 26 (FIG. 2). This downcomer cross-section 25 is defined by a straight inner edge 28 and a convex outer edge 30, both of which are transverse to the central flow axis 11. These lines intersect and terminate at points A and B to surround the downcomer cross-section 25. The centerline 32 of downcomer cross-section 25 is parallel to the central flow axis 11, and the length of this cross-section 25 is measured perpendicular to the centerline 32.

The downcomer 8 has a floor 34 which is located in the downcomer cross-section 25 to control the release of liquid from the downcomer, thus increasing the residence time of the vapor-liquid mixture in the downcomer to facilitate deentrainment of vapors from the mixture. The downcomer floor 34 occupies an area surrounded by a straight line 38 and a convex line 40 which terminate and intersect at points C and D.

In the embodiment illustrated in FIG. 3, the convex outer edge 40 of the downcomer floor 34 is curved and it is spaced from and parallel to the convex edge 30 of the downcomer cross-section, thus forming a continuous outlet slot 42 which has a uniform width (the dimension measured perpendicular to the outer edge of the downcomer). The slot length (the dimension measured parallel to the outer edge of the downcomer) is greater than its width.

Preferably, the area of the downcomer outlet is no greater than 70% of the area of the downcomer cross-section 25, the length of the outlet slot 42 is at least 60% of the length A-B of the downcomer cross-section 25, and the width of the downcomer outlet slot 42 is no more than 40% of the length of the downcomer cross-section 25. Both ends of the outlet slot are spaced from the downcomer centerline by a distance which is at least 30% of the length of the downcomer cross-section.

Various alternative downcomer and downcomer outlet arrangements are illustrated schematically in FIGS. 4–11.

Figure 4:
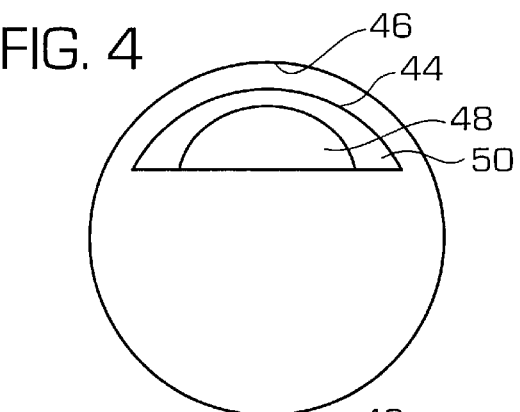
FIGS. 4–11 are diagrammatic plan views which illustrate various downcomer and downcomer floor configurations according to the invention.
Figure 5:
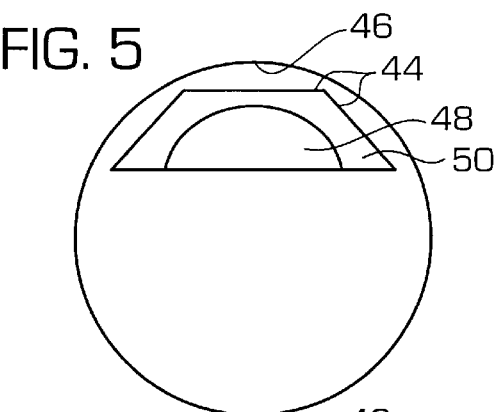
Figure 6:
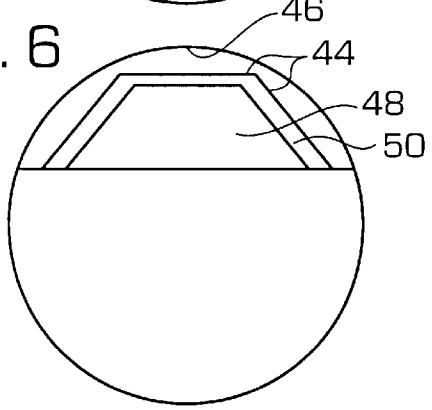
Figure 7:
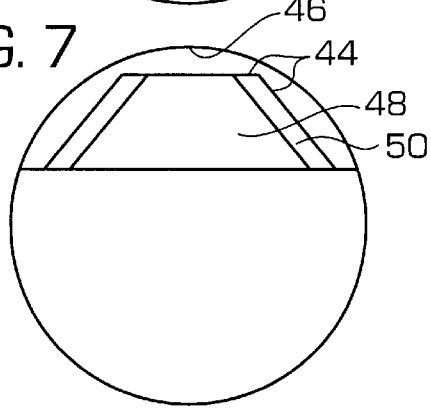
Figure 8:
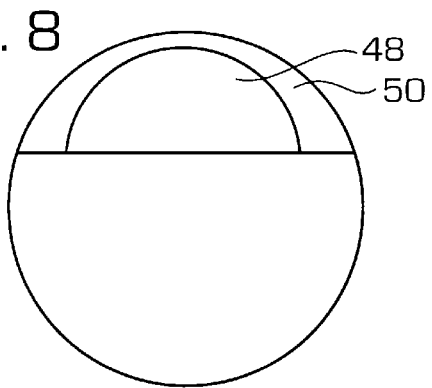

In the embodiments shown in FIGS. 4–7, the downcomers are separate from the vessels and are not formed in part by the vessel walls. The downcomers have convex walls 44 which are spaced from the interior walls 46 of the respective vessels. Floors 48 in the downcomers are shaped to form liquid outlet openings 50. In FIG. 4. the convex wall 44 is arcuate. In FIGS. 5–7, the convex walls 44 are formed of three straight segments, so the convex outer edge of the downcomer cross-section is formed of three straight lines. More segments may be provided, if desired.

Figure 9:
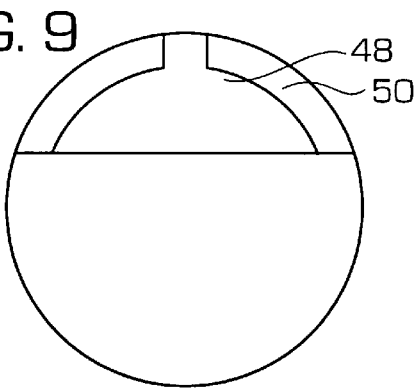
Figure 10:
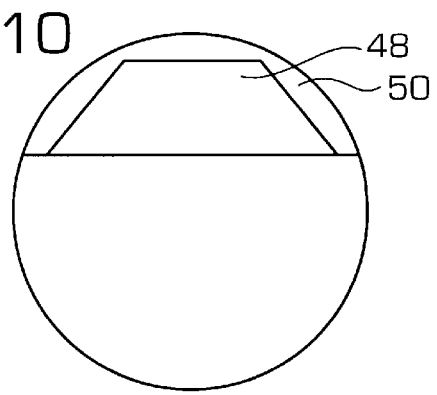
Figure 11:
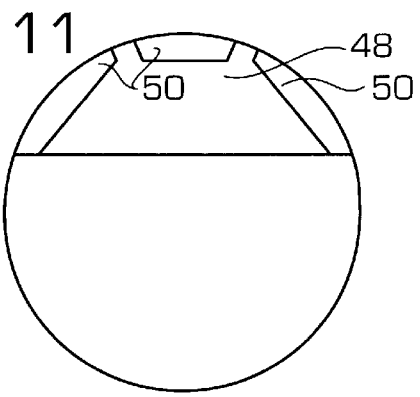

Various downcomer outlet configurations are illustrated in FIGS. 4–11. FIGS. 4–8 show a preferred arrangement in which the downcomer outlets are wider at locations which are spaced from the downcomer centerlines than at the centerlines themselves. In FIG. 9, the downcomer outlet is closed at the downcomer centerline. In FIGS. 4, 5, 8 and 9, the convex outer edges of the downcomer floors are arcuate; in FIGS. 6, 7, 10 and 11, the convex outer edges of the downcomer floors are formed by linear sections; and, in FIGS. 7, 9 and 11. the convex outer edges of the downcomer floors have a plurality of spaced apart sections.

FIG. 12 shows a downcomer floor construction which permits on-site adjustments in the width and configuration of a downcomer outlet slot. This provides a precise downflow area setup in the vessel while assuring slot symmetry when the vessel is out-of-round. The downcomer floor in this embodiment has a fixed plate 60 and three adjustable plates 62, 64 and 66 which are mounted on the fixed plate. The fixed plate 60 has a straight edge 68 and a continuous arcuate edge 70. The adjustable plates 62, 64 and 66 have arcuate outer edges 72, 74 and 76 which define the edge or edges of the downcomer outlet slot(s). During installation, the adjustable plates 62, 64 and 66 are movable on the fixed plate 60 to adjust the slot width in their respective areas. When the movable plates are at desired adjusted positions, they are fixed stationarily to the fixed plate 60 by bolts, welding or other means. Elongated bolt holes may be provided in one or more plates to facilitate adjustments and installation. In a typical installation, the slots defined by the side plates 62 and 66 would be wider than the slot defined by the center plate 64. The latter slot may have a zero width as shown in FIG. 12.

The invention may also be used in connection with multipass trays as shown by the schematic illustrations of FIGS. 13 and 14. Each of the trays in this embodiment has multiple infeed areas, multiple bubbling areas, and multiple exit openings. The trays 80 shown in FIGS. 13 and 14 have two infeed areas 82, four bubbling areas 84, and three exit openings 86. Flow at the centers of the bubbling areas is indicated by arrows 100, and flow at the sides of the bubbling areas is indicated by arrows 98.

The trays 88, shown in FIG. 13, have three infeed areas 90 which receive liquid from the downcomers of trays 80, four bubbling areas 92, and two exit openings 94. Vapor-introducing apertures are provided throughout the bubbling areas, a representative few of such apertures being illustrated in FIG. 14.

As shown in FIG. 14, the floors 97 of the end downcomers 96 are shaped to provide outlet slots 99 which, at the downcomer centerlines, are narrower than at locations which are laterally spaced from the centerlines. This provides a more uniform flow across the width of the bubbling areas which receive liquid from these slots, so that flow rates at the sides of these bubbling areas is close to the flow rates at the centers of these bubbling areas.

FIGS. 15–18 illustrate an embodiment of the invention which utilizes a preferred aperture configuration, supplemented by jets which are designed to contribute to flow uniformity on a tray.

Figure 15:
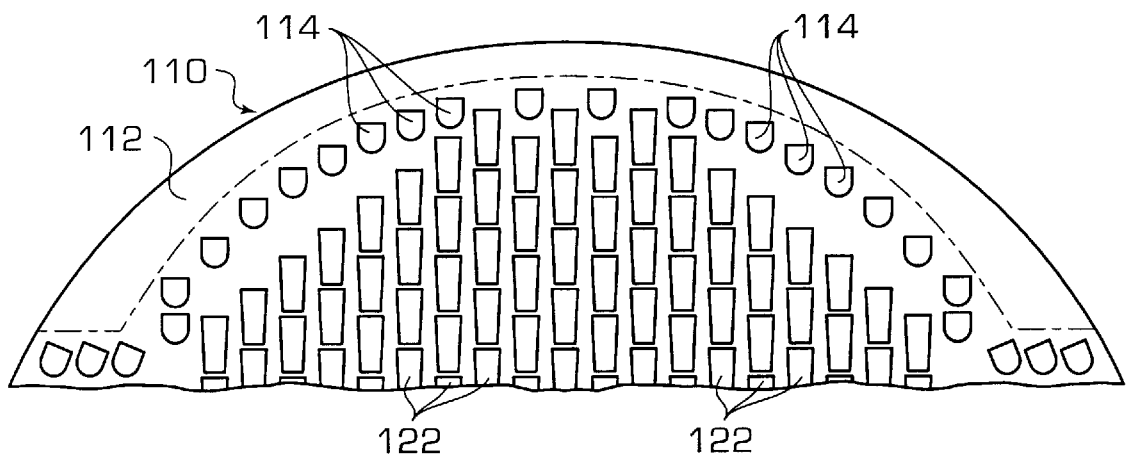
FIG. 15 is a plan view of a preferred embodiment of the invention.
Figure 16:
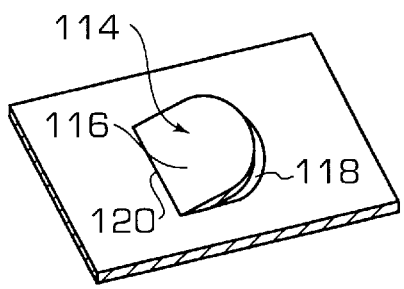
FIG. 16 is a perspective view of a jet which is used in the embodiment of FIG. 15.
Figure 17:
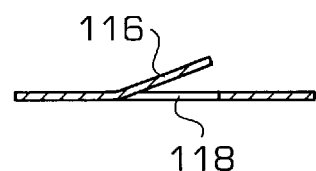
FIG. 17 is a sectional view of a jet which is used in the embodiment of FIG. 15.
Figure 18:
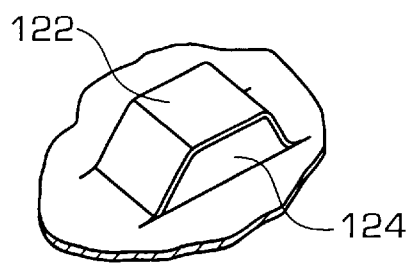
FIG. 18 is a perspective view of a vapor aperture and deflector utilized in the embodiment of FIG. 15.

As shown in FIG. 15, the tray 110, near its liquid infeed area 112, has a plurality of jets 114, each of which, as shown in FIGS. 16 and 17, consists of an inclined U-shaped deflector tab 116 which is formed of the tray material. The tab is struck up from the tray during fabrication, leaving a U-shaped vapor opening 118 in the plane of the tray. The tab is connected to and supported on the tray deck by a fold line 120. Jets of this type are known in the art as Jet Tabs. Other jets may be used, including those which include an opening in the tray. a horizontal deflector which is spaced above the opening and has a shape and size corresponding generally to the opening, and short sidewalls which connect the perimeter of the opening with the perimeter of the deflector, except in a side through which the vapor jet is directed. Such jets are usually integral with and struck up from their tray decks.

The directional orientations of the jets in FIG. 15 are such that vapor ascending through the openings 118 will strike the tabs 116 and be diverted in a direction which will impel the liquid in a forward direction, away from the liquid infeed area and toward the wider regions of the bubbling area of the tray, thus contributing to the uniform distribution of liquid across the width of the tray. To promote this effect, and as can be seen in FIG. 15, the concentration of jets 114 is less near the central flow axis than at locations which are laterally spaced from the central flow axis. The spacing density of the jets may increase progressively from a minimum at the central flow axis to a maximum at the sides of the jet area of the tray. The jets near the ends of the downcomer slot openings may have divergent centerlines as shown in FIG. 15, to direct flow along the vessel wall.

The vapor-introducing apertures in the embodiment of FIG. 15 are a preferred configuration which is known in the industry and described in detail in U.S. Pat. No. 5,360,583, the entire contents of which are incorporated into this specification by reference. The trapezoidal elements 122 in FIG. 15 are stationary horizontal deflectors. As shown in greater detail in FIG. 18, these deflectors 122 overlie corresponding apertures 124 in the plane of the tray deck, and the upstream and downstream ends of the deflectors 122 are connected to the tray deck. With this construction, the ascending vapors are introduced laterally into the liquid. Trays provided with apertures of this type are marketed and known in the industry as MVG trays.

Although the drawings accompanying this specification illustrate only sieve trays and MVG trays, the invention is suited for many different types of apertured trays known in the art, including valve trays and bubble cap trays. Although only a few embodiments of the invention have been specifically disclosed, persons skilled in the art will realize that the invention may take many other forms. Accordingly, it is emphasized that the invention is not limited to the disclosed embodiments, and it embraces modifications, variations, and improvements thereto which fall within the spirit of the following claims.

We claim:

1. Vapor-liquid contact apparatus, comprising:
   a vessel;
   a plurality of vertically spaced horizontal trays in said vessel for supporting a vapor-liquid mixture, each of said trays having a bubbling area, a liquid infeed area at an upstream end of the bubbling area, and an exit opening at a downstream end of the bubbling area;
   said bubbling area having apertures which permit ascending vapors to flow up through the tray and into a vapor-liquid mixture on the tray; said bubbling area having a central flow axis which leads from said liquid infeed area to said exit opening;
   a downcomer for receiving the vapor-liquid mixture from said tray and for carrying liquid to another said tray, said downcomer having an upper portion located at said exit opening of the tray, said downcomer having a lower portion with a cross-section which is surrounded by an inner edge and a convex outer edge, said edges extending to opposite sides of said central flow axis, said cross-section of the downcomer having a centerline which is parallel to said central flow axis;
   said downcomer having a downcomer floor in said cross-section to control flow of liquid from the downcomer, said downcomer floor forming a downcomer outlet which includes an elongated downcomer outlet slot, said downcomer outlet slot having a width which is perpendicular to the outer edge of said downcomer cross-section and a length which is parallel to the outer edge of said downcomer cross-section, said length being greater than said width and said floor having an extension in a central region of said floor. which extends into contact with the convex outer edge so as to be intermediate of elongated side outlet slot sections of said outlet slot.

2. Vapor-liquid contact apparatus according to claim 1, wherein said elongated side outlet slot sections define varying width outlet opening regions of said outlet slot at locations which are spaced from said centerline.

3. Vapor-liquid contact apparatus according to claim 1 wherein said downcomer outlet is closed by said extension at said centerline.

4. Vapor liquid contact apparatus according to claim 1, wherein the downcomer outlet has a total area which is no greater than 70% of the area of said cross-section where said downcomer floor is located.

5. Vapor-liquid contact apparatus according to claim 1, wherein the tray includes deflectors which are located above said apertures in the bubbling area.

6. Vapor-liquid contact apparatus according to claim 5, wherein the deflectors are stationary relative to the tray and have upstream and downstream ends connected to the tray so that vapors ascending through said apertures are introduced laterally into liquid in the bubbling area.

7. Vapor-liquid contact apparatus according to claim 1, wherein the tray is provided with jets which are located and oriented to accelerate movement of liquid from the liquid infeed area into and through the bubbling area, each of said jets including a jet opening in the tray and a deflector for deflecting vapors ascending through said jet opening in a direction away from said liquid infeed area.

8. Vapor-liquid contact apparatus according to claim 7, wherein the jets have a spacing density which is less in areas near the central flow axis than in areas which are laterally spaced from the central flow axis.

9. Vapor-liquid contact apparatus according to claim 1, wherein the vessel has an interior wall surface which is the convex outer edge of the cross-section of the downcomer.

10. Vapor-liquid contact apparatus according to claim 1, wherein the vessel has an interior wall surface which is spaced from the convex outer edge of the cross-section of the downcomer.

11. Vapor-liquid contact apparatus according to claim 1, wherein the convex outer edge of said cross-section of the downcomer is formed of at least three straight lines.

12. Vapor-liquid contact apparatus, comprising:
    a vessel;
    a plurality of vertically spaced horizontal trays in said vessel for supporting a vapor-liquid mixture, each of said trays having a bubbling area, a liquid infeed area at an upstream end of the bubbling area, and an exit opening at a downstream end of the bubbling area, said bubbling area having apertures which permit ascending vapors to flow up through the tray and into a vapor-liquid mixture on the tray; said bubbling area having, a central flow axis which leads from said liquid infeed area to said exit opening;
    a downcomer for receiving the vapor-liquid mixture from said tray and for carrying liquid to another said tray, said downcomer having an upper portion located at said exit opening of the tray, said downcomer having a lower portion with a cross-section which is surrounded by an inner edge and a convex outer edge, said edges extending to opposite sides of said central flow axis, said cross-section of the downcomer having a centerline which is parallel to said central flow axis;
    said downcomer having a downcomer floor in said cross-section to control flow of liquid from the downcomer, said downcomer floor forming a downcomer outlet which includes an elongated downcomer outlet slot, said downcomer outlet slot having a width which is perpendicular to the outer edge of said downcomer cross-section and a length which is parallel to the outer edge of said downcomer cross-section said length being greater than said width, said width at said centerline being no greater than said width at locations which are spaced from said centerline and
    wherein said downcomer floor includes a fixed plate and at least one adjustable plate which is mounted on said fixed plate, said adjustable plate having an edge which defines an edge of said downcomer outlet slot, said adjustable plate being movable on said fixed plate to permit adjustments in slot configuration during installation of the apparatus.

13. Vapor-liquid contact apparatus according to claim 12, wherein said downcomer floor includes a plurality of said adjustable plates.

14. Vapor-liquid contact apparatus according to claim 1, wherein the downcomer outlet slot has a uniform width.

15. Vapor-liquid contact apparatus according to claim 1, wherein the outlet slot has an end which is spaced from the downcomer centerline by a distance which is at least 30% of the length of said cross-section.

16. Vapor-liquid contact apparatus according to claim 1, wherein the outlet slot has a width which is no more than about 40% of the length of said cross-section.

17. Vapor-liquid contact apparatus according to claim 1, wherein said liquid infeed area is substantially devoid of apertures so as to prevent ascending vapors from affecting the flow in a preceding downcomer of a tray thereabove and to prevent liquid in the preceding downcomer from weeping through the liquid infeed area.

18. Vapor-liquid contact apparatus according to claim 1, wherein the downcomer floor has an edge which is parallel to said convex outer edge of said cross-section.

19. Vapor-liquid contact apparatus according to claim 1, wherein said downcomer floor has a curved edge.

20. Vapor-liquid contact apparatus according to claim 1, wherein said downcomer floor has an edge formed of linear sections.

21. Vapor-liquid contact apparatus according to claim 1, wherein said downcomer floor has a convex outer edge which has a plurality of spaced apart sections.

22. Vapor-liquid contact apparatus, comprising:
a vessel;
a plurality of vertically spaced horizontal trays in said vessel for supporting a vapor-liquid mixture, each of said trays having a bubbling area, a liquid infeed area at an upstream end of the bubbling area, and an exit opening at a downstream end of the bubbling area;
said bubbling area having apertures which permit ascending vapors to flow up through the tray and into a vapor-liquid mixture on the tray; said bubbling area having a central flow axis which leads from said liquid infeed area to said exit opening;
a downcomer for receiving the vapor-liquid mixture from said tray and for carrying liquid to another said tray, said downcomer having an upper portion located at said exit opening of the tray, said downcomer having a lower portion with a cross-section which is surrounded by an inner edge and a convex outer edge, said edges extending to opposite sides of said central flow axis, said cross-section of the downcomer having a centerline which is parallel to said central flow axis;
said downcomer having a downcomer floor in said cross-section to control flow of liquid from the downcomer, said downcomer floor forming a downcomer outlet which includes an elongated downcomer outlet slot, said downcomer outlet slot having a width which is perpendicular to the outer edge of said downcomer cross-section and a length which is parallel to the outer edge of said downcomer cross-section, said length being greater than said width, said downcomer floor having an outer edge at least a portion of which extends to the convex outer edge of the cross-section of the downeomer the outer edge of said downcomer floor having a portion which is spaced from said outer edge of said cross-section of the downcomer to form said downcomer outlet, said outer edge of said downcomer floor being convex.

23. Vapor-liquid contact apparatus according to claim 22, wherein said downcomer outlet is wider at locations which are spaced from said centerline than at said centerline.

24. Vapor-liquid contact apparatus according to claim 23 wherein said downcomer outlet is closed at said centerline.

25. Vapor-liquid contact apparatus according to claim 22, wherein the downcomer outlet has a total area which is no greater than 70% of the area of said cross-section where said downcomer floor is located.

26. Vapor-liquid contact apparatus according to claim 22, wherein the tray includes deflectors which are located above said apertures in the bubbling area.

27. Vapor-liquid contact apparatus according to claim 26, wherein the deflectors are stationary relative to the tray and have upstream and downstream ends connected to the tray so that vapors ascending through said apertures are introduced laterally into liquid in the bubbling area.

28. Vapor-liquid contact apparatus according to claim 22, wherein the tray is provided with jets which are located and oriented to accelerate movement of liquid from the liquid infeed area into and through the bubbling area, each of said jets including a jet opening in the tray and a deflector for deflecting vapors ascending through said jet opening in a direction away from said liquid infeed area.

29. Vapor-liquid contact apparatus according to claim 28, wherein the jets have a spacing density which is less in areas near the central flow axis than in areas which are laterally spaced from the central flow axis.

30. Vapor-liquid contact apparatus according to claim 22, wherein the vessel has an interior wall surface which is the convex outer edge of the cross-section of the downcomer.

31. Vapor-liquid contact apparatus according to claim 22, wherein the vessel has an interior wall surface which is spaced from the convex outer edge of the cross-section of the downcomer.

32. Vapor-liquid contact apparatus according to claim 22, wherein the convex outer edge of said cross-section of the downeomer is formed of at least three straight lines.

33. Vapor-liquid contact apparatus, comprising:
a vessel;
a plurality of vertically spaced horizontal trays in said vessel for supporting a vapor-liquid mixture, each of said trays having a bubbling area, a liquid infeed area at an upstream end of the bubbling area, and an exit opening at a downstream end of the bubblin, area;
said bubbling area having apertures which permit ascending vapors to flow up through the tray and into a vapor-liquid mixture on the tray; said bubbling area having a central flow axis which leads from said liquid infeed area to said exit opening;
a downcomer for receiving the vapor-liquid mixture from said tray and for carrying liquid to another said tray, said downcomer having an upper portion located at said exit opening of the tray, said downcomer having a lower portion with a cross-section which is surrounded by an inner edge and a convex outer edge, said edges extending to opposite sides of said central flow axis, said cross-section of the downcomer having a centerline which is parallel to said central flow axis;
said downcomer having a downcomer floor in said cross-section to control flow of liquid from the downcomer, said downcomer floor forming a downcomer outlet which includes an elongated downcomer outlet slot, said downcomer floor having an outer edge at least a portion of which is spaced from said outer edge of said cross-section of the downcomer to form said downcomer outlet, said outer edge of said downcomer floor being convex, and wherein said downcomer floor includes a fixed plate and at least one adjustable plate which is mounted on said fixed plate, said adjustable plate having an edge which defines an edge of said downcomer outlet slot, said adjustable plate being movable on said fixed plate to permit adjustments in slot configuration during installation of the apparatus.

34. Vapor-liquid contact apparatus according to claim 33, wherein said downcomer floor includes a plurality of said adjustable plates.

35. Vapor-liquid contact apparatus according to claim 22, wherein the downcomer outlet slot has a uniform width.

36. Vapor-liquid contact apparatus according to claim 22, wherein the outlet slot has an end which is spaced from the downcomer centerline by a distance which is at least 30% of the length of said cross-section.

37. Vapor-liquid contact apparatus according to claim 22, wherein the outlet slot has a width which is no more than about 40% of the length of said cross-section.

38. Vapor-liquid contact apparatus according to claim 22, wherein said liquid infeed area is substantially devoid of apertures so as to prevent ascending vapors from affecting the flow in a preceding downcomer of a tray thereabove and to prevent liquid in the preceding downcomer from weeping through the liquid infeed area.

39. Vapor-liquid contact apparatus according to claim 22, wherein the outer edge of the downcomer floor is parallel to said outer edge of said cross-section.

40. Vapor-liquid contact apparatus according to claim 22, wherein the outer edge of the downcomer floor is curved.

41. Vapor-liquid contact apparatus according to claim 22, wherein the outer edge of the downcomer floor is formed of linear sections.

42. Vapor-liquid contact apparatus according to claim 22, wherein the outer edge of the downcomer floor is formed of a plurality of spaced apart sections.

43. Vapor liquid contact apparatus according to claim 1 wherein said width of the outlet slot in the central region of said floor is no greater than said width at locations which are spaced from said centerline.

44. Vapor liquid contact apparatus according to claim 1 wherein said downcomer floor includes a fixed plate and an adjustable plate with said adjustable plate defining said extension when said adjustable plate is adjusted to a contact adjustment state with respect to the outer edge of said downcomer cross section, and said adjustable plate is mounted on said fixed plate, said adjustable plate having an adjustable edge for defining an edge of said downcomer outlet slot, and said adjustable plate being movable on said fixed plate away from the outer edge of said downcomer cross section to permit adjustments in slot configuration during installation of the apparatus.

45. Vapor liquid contact apparatus according to claim 2 wherein said elongated side outlet slot sections are wider at locations farther removed from the central region than closer into said central region.

46. Vapor liquid contact apparatus according to claim 1 wherein there are a pair of spaced apart extensions in the central regions of said floor fixed to the convex outer wall.

47. Vapor liquid contact apparatus according to claim 46 wherein an elongated central slot section of said outlet slot is defined by said pair of spaced apart extensions and positioned intermediate said elongated side outlet slot sections.

48. Vapor-liquid contact apparatus according to claim 22, wherein said downcomer floor includes a fixed plate and at least one adjustable plate which is mounted on said fixed plate, said adjustable plate having an edge which defines an edge of said downcomer outlet slot, said adjustable plate being movable on said fixed plate to permit adjustments in slot configuration during installation of the apparatus.

49. Vapor-liquid contact apparatus according to claim 1 wherein said floor extends directly off a downcomer inner wall defining said inner edge, with said inner wall including a portion extending parallel to a direction of main extension of said tower below said tray.

50. Vapor-liquid contact apparatus according to claim 22 wherein said floor extends directly off a downcomer inner wall defining said inner edge, with said inner wall including a portion extending parallel to a direction of main extension of said tower below said tray.

51. Vapor liquid contact apparatus according to claim 1 wherein the outlet of said slot sections are symmetrically positioned and configured with respect to said centerlines.

52. Vapor liquid contact apparatus according to claim 12 wherein the outer edge of said adjustable plate defines a radial interior edge of said downcomer outlet slot and said convex outer edge defining a radial outer edge of said downcomer outlet slot.

* * * * *